(12) United States Patent
Wang et al.

(10) Patent No.: US 12,479,082 B1
(45) Date of Patent: Nov. 25, 2025

(54) MOBILE ROBOT, CONTROLLER, AND LOCALIZATION METHOD FOR MOBILE ROBOT

(71) Applicant: VisionNav Robotics USA Inc., Acworth, GA (US)

(72) Inventors: Pengpeng Wang, Acworth, GA (US); Yujie Lu, Acworth, GA (US); Fan Zheng, Acworth, GA (US)

(73) Assignee: VISIONNAV ROBOTICS USA INC., Acworth, GA (US)

( * ) Notice: Subject to any disclaimer, the term of this patent is extended or adjusted under 35 U.S.C. 154(b) by 0 days.

(21) Appl. No.: 19/193,588

(22) Filed: Apr. 29, 2025

(51) Int. Cl.
*B25J 5/00* (2006.01)
*B25J 9/16* (2006.01)

(52) U.S. Cl.
CPC ............... *B25J 5/007* (2013.01); *B25J 9/161* (2013.01); *B25J 9/1664* (2013.01)

(58) Field of Classification Search
CPC .......... B25J 5/007; B25J 9/161; B25J 9/1664
See application file for complete search history.

(56) References Cited

FOREIGN PATENT DOCUMENTS

| CN | 115908736 A | 4/2023 | |
|---|---|---|---|
| CN | 116977622 A | * 10/2023 | ........... G01S 7/4802 |

* cited by examiner

*Primary Examiner* — Jason Holloway
*Assistant Examiner* — Elizabeth Rose Neleski
(74) *Attorney, Agent, or Firm* — MUNCY, GEISSLER, OLDS & LOWE, P.C.

(57) ABSTRACT

Disclosed are a mobile robot, a controller, and a localization method for a mobile robot. The mobile robot includes a processor. The processor is configured to execute a program instruction so as to implement the following steps: determining, after the mobile robot is started up, whether the mobile robot operates in a first mode; loading a local map from a memory according to an initial position of the mobile robot in response to the mobile robot operating in the first mode; conducting pose matching according to a current position point cloud based on the local map, and outputting a current pose; determining, according to the current pose, whether a key frame corresponding to the local map is changed; and outputting a current position of the mobile robot in response to the key frame corresponding to the local map being unchanged.

19 Claims, 9 Drawing Sheets

MOBILE ROBOT, CONTROLLER, AND LOCALIZATION METHOD FOR MOBILE ROBOT

TECHNICAL FIELD

The disclosure belongs to the field of mobile robot localization, and particularly relates to a mobile robot, a controller, and a localization method for a mobile robot.

BACKGROUND

In a localization method for a mobile robot through a three-dimensional (3D) laser radar in the prior art, all point clouds are generally loaded at a time after initialization. However, this method will consume excessively large memory space. In a method for loading point clouds in blocks, no transition is configured between maps. Thus, localization jitter occurs during map switching.

BRIEF DESCRIPTION OF THE DRAWINGS

The accompanying drawings provided for further understanding of the disclosure constitute part of the description, and serve to explain the disclosure along with the following specific implementations, instead of limiting the disclosure. In the accompanying drawings.

DETAILED DESCRIPTION

Figure 1A:
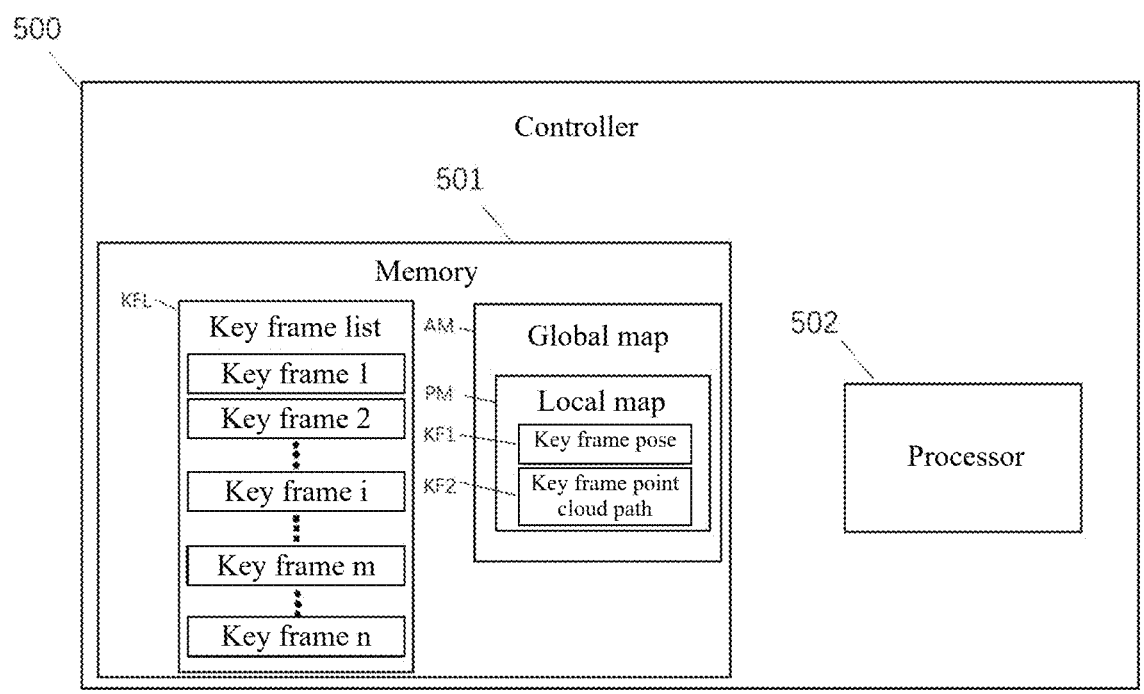
FIG. 1A shows a schematic block diagram of a controller according to an embodiment of the disclosure.

Contents disclosed below provide various implementations or examples, which can be used to implement different features of the disclosed contents. Specific examples of components and configurations will be described below to simplify the disclosed content. It may be conceived that the descriptions are merely illustrative, and are not intended to limit the disclosed content. For example, in the following description, a first feature is formed on or above a second feature, which may include some embodiments in which the first feature and the second feature are in direct contact with each other. In addition, in some embodiments, an additional component may be formed between the first feature and the second feature, such that the first feature and the second feature may not be in direct contact with each other. In addition, component symbols and/or numbers may be repeatedly used in a plurality of embodiments of the disclosed contents. The repeated use is based on an objective of brevity and clarity, and does not represent a relation between the different discussed embodiments and/or configurations.

In addition, relative spatial words used herein, such as "below", "lower portion", "lower", "above", "upper portion", and similar terms, may be used for ease of describing a relation between one component or feature shown in the figure and another component or feature. The relative spatial words are intended to cover various different orientations of the apparatus during use or operation in addition to the orientations shown in the figures. The device may be placed at another orientation (for example, rotated by 90 degrees or at another orientation), and the relative spatial description words should be correspondingly explained.

Although numerical ranges and parameters used to define a broad scope of the disclosure are approximate values, relevant values in specific embodiments are presented as precisely as possible herein. However, any value essentially inevitably includes a standard deviation caused by an individual test method. Herein, "roughly" generally means that an actual value is within plus or minus 10%, 5%, 1%, or 0.5% of a particular value or range. Alternatively, the term "roughly" means that the actual value falls within an acceptable standard error of a mean value, and is determined by consideration of those of ordinary skill in the art to which the disclosure belongs. It may be understood that, except experimental examples, or unless otherwise clearly stated, all ranges, amounts, values, and percentages used herein (for example, for describing a material amount, a time length, a temperature, an operating condition, an amount ratio, and other similar parameters) are modified by "roughly". Thus, unless otherwise specified to the contrary, numerical parameters disclosed in the description and appended claims are approximate values, and may be changed as required. The numerical parameters should be understood as at least a specified number of valid digits and a numerical value obtained through a common carry method. Herein, a value range is represented as a range from one end point to another end point or between the two end points. Unless otherwise specified, the value range described herein includes endpoints.

As a core technology, a localization method for a mobile robot relates to operational stability and accuracy of a device. Through precise localization, the mobile robot may implement path planning, obstacle avoidance, and precise access to goods, thus ensuring that the mobile robot operates efficiently in various complex environments. However, in a localization method for a mobile robot through a three-dimensional (3D) laser radar in the prior art, all point clouds are generally loaded at a time after initialization. This way may consume excessively large memory space and computation capability. In a method for loading point clouds in blocks, no transition is configured between maps. Thus, localization jitter occurs during map switching.

The disclosure provides a localization method for a mobile robot, a controller, and a mobile robot. The mobile robot includes a mobile device capable of autonomously or semi-autonomously executing a task, has an autonomous movement and navigation capability, and has common forms: an automated guided vehicle (AGV), an autonomous mobile robot (AMR), a humanoid robot, etc., or other forms such as an intelligent vehicle and a robot vacuum cleaner.

With reference to FIG. 1A, FIG. 1A shows a schematic block diagram of a controller 500 according to an embodiment of the disclosure. In some embodiments, the controller 500 may include a memory 501 and a processor 502. In some embodiments, the processor 502 is operatively coupled to the memory 501. In some embodiments, the processor 502 may be an integrated element. The processor 502 may be composed of a plurality of processing units. The processor 502 may include a computation unit or a core computation unit. The processor 502 may be configured to load data information from the memory 501. The processor 502 may store data information in the memory 501. The processor 502 may receive data from another hardware device. The processor 502 may process data from another hardware device.

In some embodiments, the memory 501 may be an integrated element. The memory 501 may be regarded to be composed of a plurality of memory units. Information, for example but not limited to data such as a point cloud path, a pose, and a key frame, may be respectively stored in different memory units or stored in an identical memory unit.

Figure 1B:
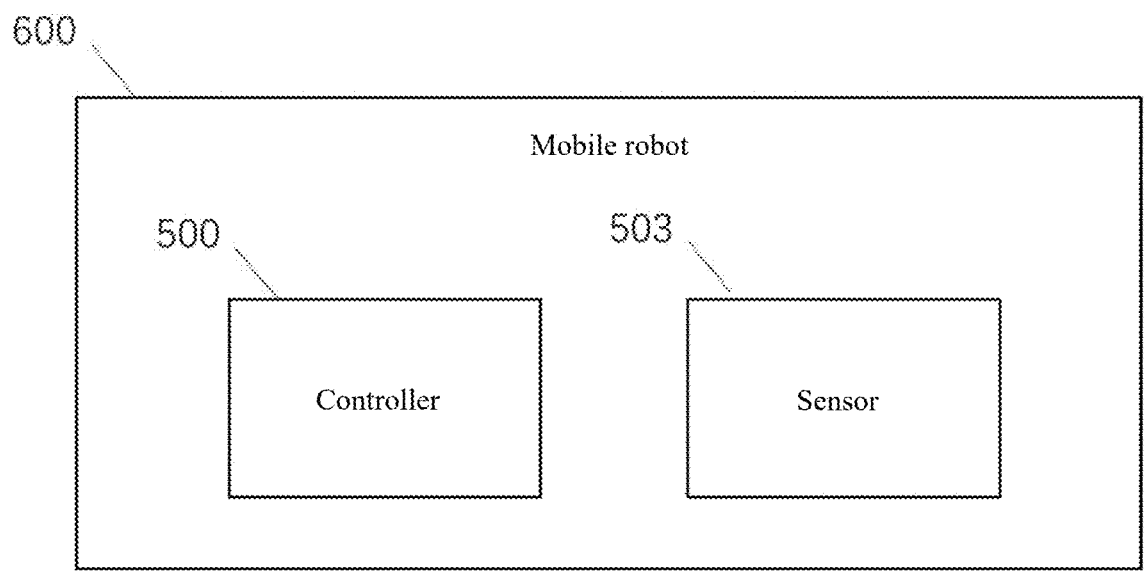
FIG. 1B shows a schematic block diagram of a mobile robot according to an embodiment of the disclosure.

FIG. 1B shows a schematic block diagram of a mobile robot 600 according to an embodiment of the disclosure. In some embodiments, the mobile robot 600 includes a controller 500 and a sensor 503 shown in FIG. 1A. In some embodiments, the controller 500 is operatively coupled to the sensor 503. In some embodiments, the controller 500 cooperates with the sensor 503 so as to implement the localization method provided by the disclosure. In some embodiments, the sensor 503 may be an integrated element. The sensor 503 may be considered to be composed of a plurality of sensor elements. The sensor 503 includes, for example but not limited to, a laser radar, a visual sensor, an inertial measurement unit, etc.

Figure 1C:
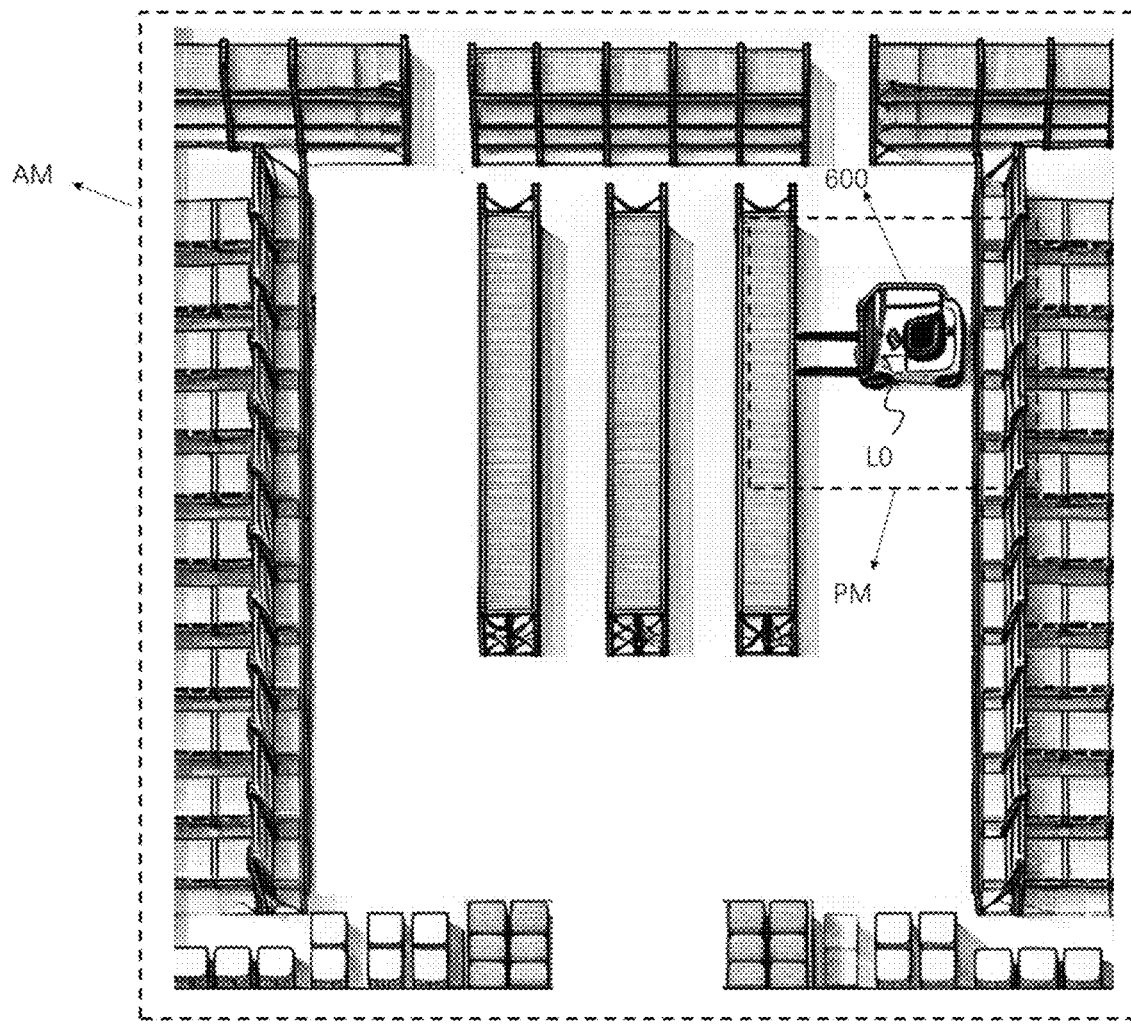
FIG. 1C shows a schematic diagram of a scene where a mobile robot is applied to a warehouse according to an embodiment of the disclosure.

With reference to FIG. 1C, FIG. 1C shows a schematic diagram of a scene where a mobile robot 600 is applied to a warehouse according to an embodiment of the disclosure. In some embodiments, the mobile robot 600 operates and works on a global map AM of a warehouse shown in FIG. 1C. The mobile robot 600 may take goods from a warehouse zone according to an instruction, precisely place the goods at a specified position, and dynamically plan a path according to real-time data through cooperation of the sensor 503 and the processor 502, so as to avoid collision and improve operation efficiency. It should be noted that, a pattern of the mobile robot 600 shown in FIG. 1C is merely for illustrative purpose, and is not a limitation of the disclosure.

Figure 2:
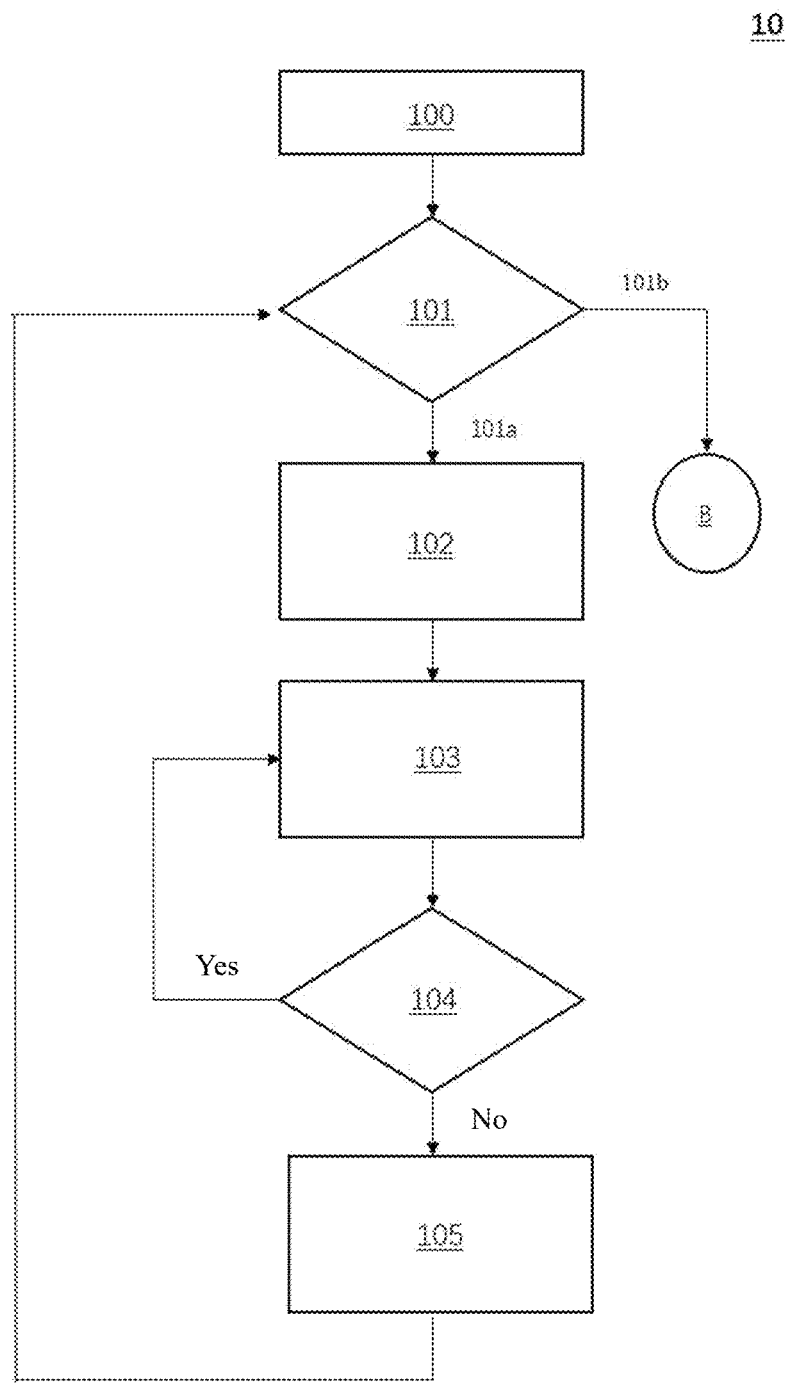
FIG. 2 shows a flowchart of a localization method for a mobile robot according to an embodiment of the disclosure.

FIG. 2 shows a flowchart of a localization method 10 for a mobile robot according to an embodiment of the disclosure. If an approximately identical result may be obtained, the disclosure is not limited to completely execute the steps of the flow shown in FIG. 2. It should be noted that the steps of the flow shown in FIG. 2 are not completely limited to application to the mobile robot. The following embodiments are described with FIG. 1A to FIG. 1C as an example. In some embodiments, the steps of the localization method 10 for a mobile robot may be executed by different processing units or an identical processing unit in the processor 502.

The localization method 10 for a mobile robot includes:

Step 100: a mobile robot 600 is started up.

Figure 7:
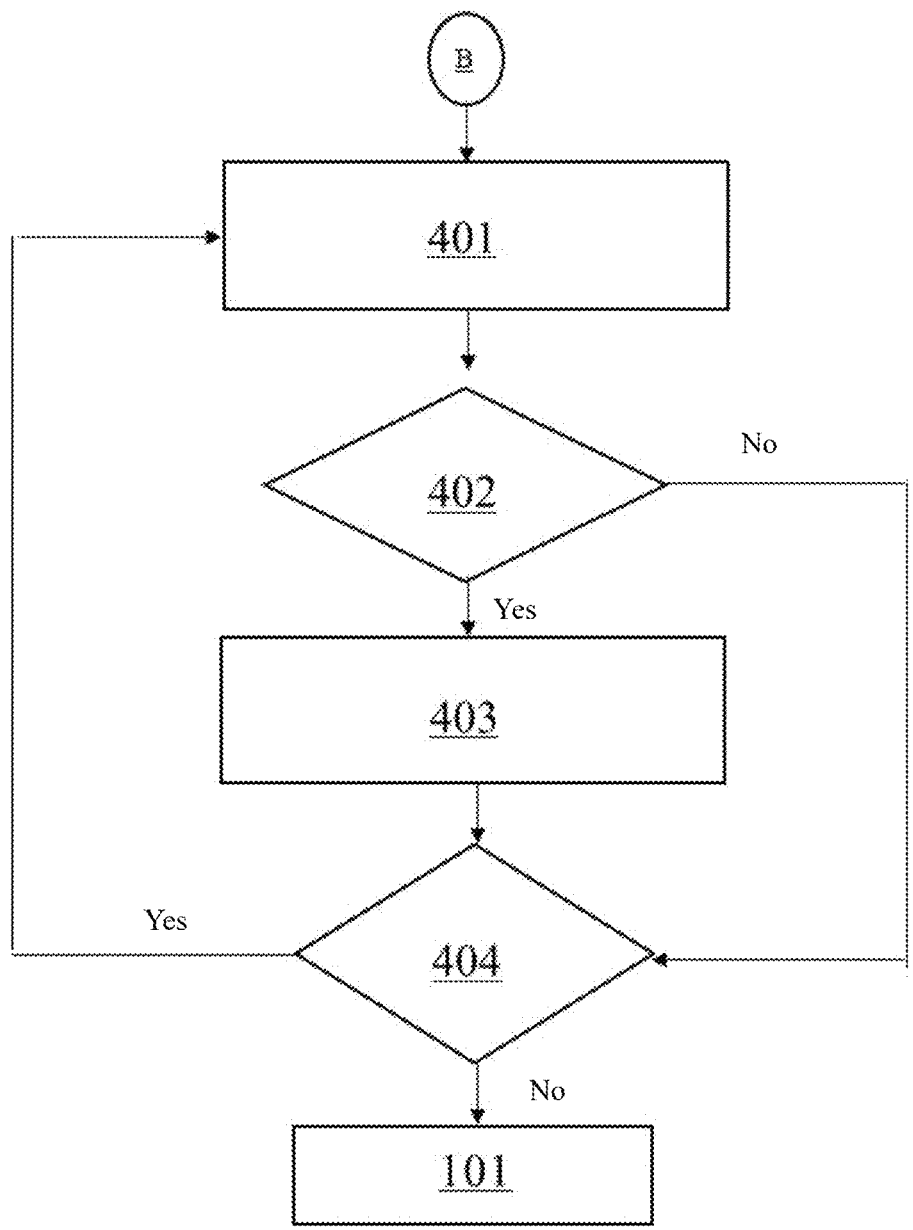
FIG. 7 shows a flowchart of another part of a localization method for a mobile robot according to an embodiment of the disclosure.

Step 101: the processor 502 determines that the mobile robot 600 operates in a mode 101*a* or a mode 101*b*, and if the mobile robot 600 operates in the mode 101*a*, step 102 is entered; and if the mobile robot 600 operates in the mode 101*b*, a method flow in FIG. 7 is entered. In some embodiments, the mode 101*a* and the mode 101*b* correspond to a localization mode and a mapping mode of the mobile robot 600 respectively.

Figure 3:
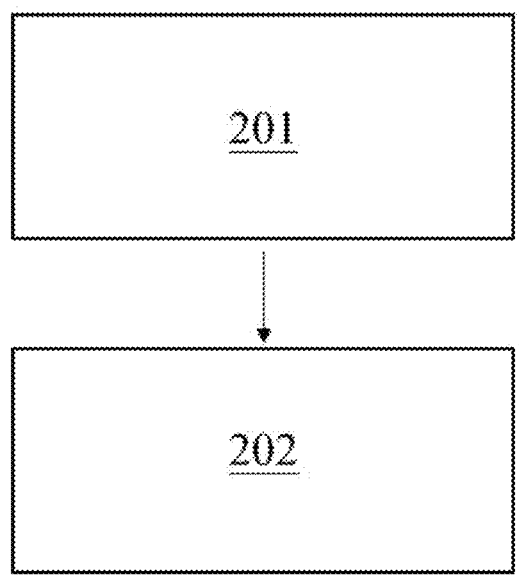
FIG. 3 shows a detailed flowchart of step 102 according to an embodiment of the disclosure.

Step 102: the processor 502 loads information of a local map PM from a memory 501 according to an initial position L0 of the mobile robot 600. It may be understood that the local map PM is part of a global map AM. In some embodiments, the local map PM may be a zone that is expanded outward by a fixed area with the initial position L0 as an origin. In other words, the local map PM includes the initial position L0 of the mobile robot 600. It may be understood that when the mobile robot 600 starts to move, the local map PM no longer corresponds to the initial position L0, and corresponds to a current position of the mobile robot 600. With reference to FIG. 3, FIG. 3 shows a detailed flowchart of step 102 according to an embodiment of the disclosure. In some embodiments, step 102 may include the following step:

Step 201: the initial position L0 of the mobile robot 600 is set.

In some embodiments, the initial position L0 of the mobile robot 600 may be a position of the mobile robot 600 during startup. In some embodiments, the initial position L0 of the mobile robot 600 may be a position of the processor 502 of the mobile robot 600 during initialization. In some embodiments, the initial position L0 of the mobile robot 600 may be a position of the mobile robot 600 during re-startup. In some embodiments, the initial position L0 of the mobile robot 600 may be a position of the mobile robot 600 during previous shutdown. In some embodiments, when the mobile robot 600 is re-started up, the processor 502 loads the position of the mobile robot 600 during previous shutdown from the memory 501 as the initial position L0.

Figure 3A:
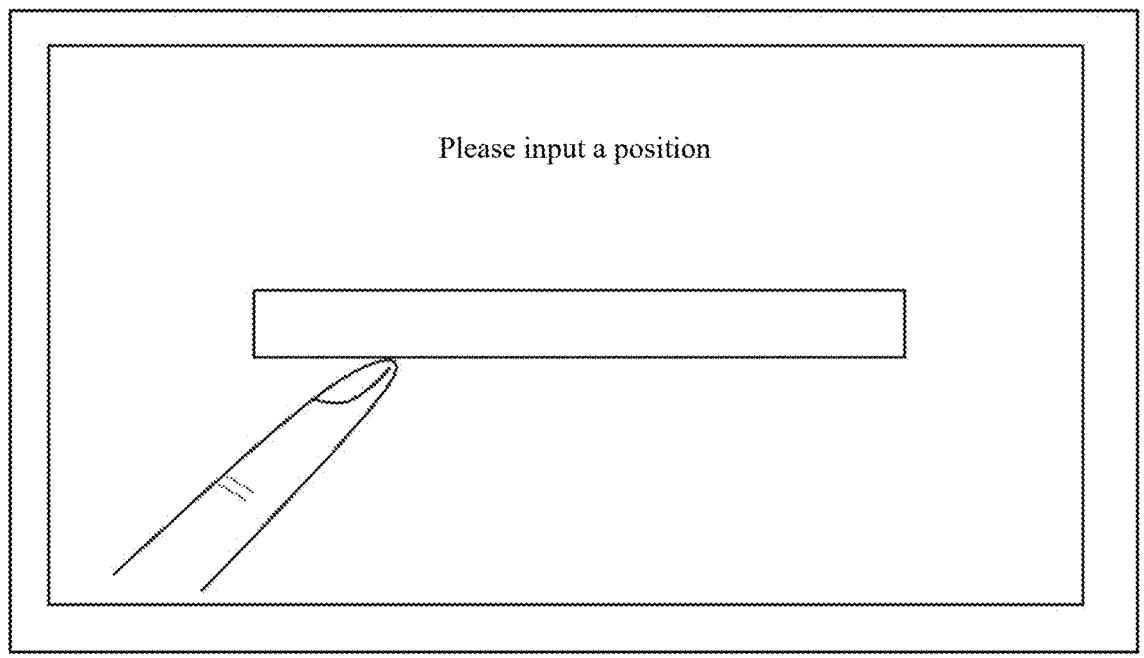
FIG. 3A shows a schematic diagram of a scene where a user inputs an initial position through an input interface according to an embodiment of the disclosure.

In some embodiments, as shown in FIG. 3A, the initial position L0 of the mobile robot 600 may be directly input by an operator through an input interface (for example, but not limited to, a touch screen) after the mobile robot 600 is started up. In some embodiments, the operator may input, through the input interface, a walkway in which the mobile robot 600 is located or two racks between which the mobile robot is located, thus inputting the initial position L0 of the mobile robot 600.

In some embodiments, step 102 may further include the following step:

Step 202: the processor 502 loads a local map key frame pose KF1 and a local map key frame point cloud path KF2 from the memory 501 according to the initial position L0 of the mobile robot 600. In some embodiments, the local map key frame pose KF1 and the local map key frame point cloud path KF2 are poses and point cloud paths of all key frames, for example, a key frame i to a key frame m, in the area of the local map PM. The local map key frame pose KF1 and the local map key frame point cloud path KF2 are sensed by the sensor 503 when the mobile robot 600 operates in the mode 101*b* and passes the area of the local map PM. The local map key frame pose KF1 and the local map key frame point cloud path KF2 are processed by the processor 502 and then stored in the memory 501 or a magnetic disk (not shown in the figure), so as to be used by the mobile robot 600 when the mobile robot operates in the mode 101*a*.

In some embodiments, the memory 501 stores a key frame list KFL that records all key frames 1 to n of the global map AM. Each key frame records a corresponding pose and a corresponding point cloud path. It may be understood that all the key frames included in the local map PM, for example, the key frame i to the key frame m, are also located in the key frame list KFL. The processor 502 loads the key frame i to the key frame m corresponding to the local map PM from the memory 501.

In some embodiments, the key frame list KFL recording all the key frames 1 to n of the global map AM exists in the magnetic disk (not shown in the figure) of the mobile robot 600. In step 301, the processor 502 loads neighboring key frames corresponding to the local map PM from the magnetic disk according to a current pose of the mobile robot 600, and updates the neighboring key frames corresponding to the local map PM in the memory 501 in real time. In this way, the memory 501 does not need to store all the key frames 1 to n of the global map AM, such that consumption of memory space can be reduced.

It should be noted that the disclosure does not limit forms in which the local map key frame pose KF1 and the local map key frame point cloud path KF2 are stored in the memory 501. For example, the local map key frame pose may be represented in a matrix or quaternion manner, and stored in the memory 501. For example, the local map key frame point cloud path may be represented in a matrix or point set manner, and is stored in the memory 501.

Further, with reference to FIG. 2, the localization method 10 for a mobile robot further includes the following steps:

Step 103: the processor 502 conducts pose matching according to a current position point cloud of the mobile robot 600 based on the local map PM, and outputs the current pose. It may be understood that when the mobile robot 600 is just started up, the current position is equivalent to the initial position L0. In other words, after the mobile robot 600 starts to move, the current position is not equivalent to the initial position L0, and the local map PM corresponding to the current position is simultaneously changed in real time.

In some embodiments, the processor 502 drives the sensor 503 to sense point cloud data of the current position, matches the point cloud data with information of the local map PM loaded from the memory 501, and computes a pose (for example, a position and an orientation) of the current position. Regarding the output of the current pose in step 103, in some embodiments, the processor 502 may divide point cloud distribution computation of the current position into a plurality of subtasks, and the plurality of subtasks may conduct multi-thread computation through a plurality of processing units in the processor 502, such that operation efficiency is improved. In some embodiments, point cloud distribution computation of the current position may include the following step: the processor 502 conducts normal distributions transform (NDT) matching. As an algorithm for point cloud registration, NDT matching converts the point cloud data into a normal distribution form, and converts a discrete point cloud registration problem into a continuous optimization problem through continuity and differentiability of normal distributions, such that a computation process may be simplified, and registration efficiency and precision may be improved.

However, the disclosure is not limited to computing a point cloud distribution of the current position through a NDT matching technology. In other embodiments, the method may be implemented through an iterative closest point (ICP) technology. The ICP algorithm is used to align a source point cloud (real-time point cloud data of the current position sensed by the sensor 503) with a target point cloud (static point cloud data used as a reference, and for example, a point cloud model established previously), and iteratively compute an optimal rotation and translation transformation, so as to minimize a point error corresponding to the source point cloud and the target point cloud.

In other embodiments, the method may be implemented through a generalized iterative closest point (GICP) technology. The GICP algorithm is based on the ICP algorithm. The GICP algorithm combines a partial set structure feature of a point cloud, describes a plane feature of each point by computing a covariance matrix of the point, and uses the features to conduct matching and rigid-body transformation optimization, so as to improve precision and stability of point cloud registration.

Step 104: the processor 502 determines, according to the current pose of the mobile robot 600, whether the key frame corresponding to the local map PM is changed, if yes, step 103 is returned to; and otherwise, step 105 is entered.

Figure 4:
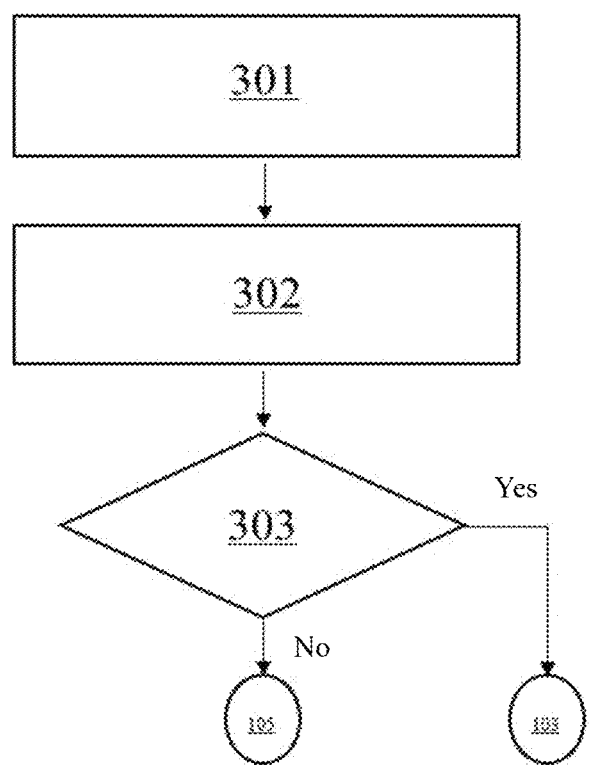
FIG. 4 shows a detailed flowchart of step 104 according to an embodiment of the disclosure.

Refer to FIG. 4 for detailed description of step 104. In some embodiments, step 104 includes the following steps:

Step 301: the processor 502 loads the neighboring key frames according to the current pose of the mobile robot 600.

Step 302: the processor 502 computes concave and convex hulls of the current pose according to the plurality of neighboring key frames.

Step 303: the processor 502 determines, according to the concave and convex hulls of the current pose of the mobile robot 600, whether the key frames corresponding to the local map PM are changed, if yes, step 103 is returned to; and otherwise, step 105 is entered.

Figure 5:
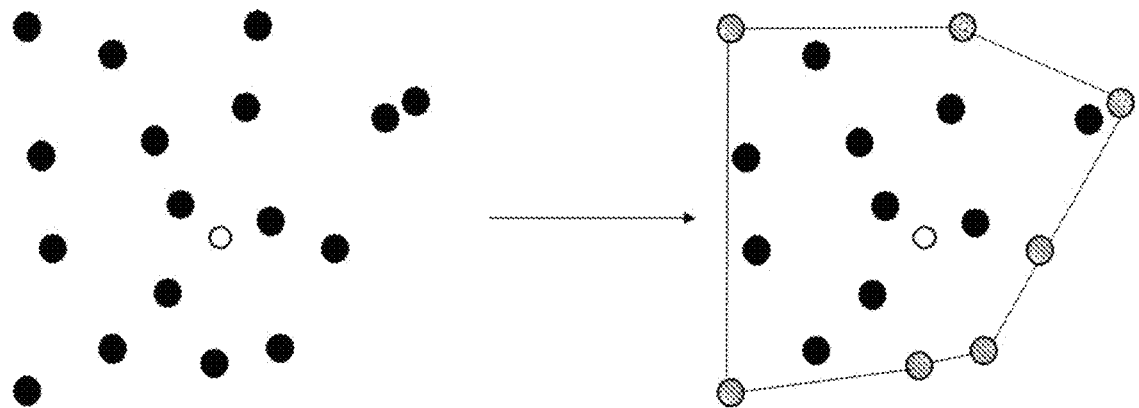
FIG. 5 shows a schematic diagram of step 301 to step 303 according to an embodiment of the disclosure.

Refer to FIG. 5 for detailed description of step 301 to step 303. For example, a white point may be used as the current pose of the mobile robot 600, and for example, is the current pose of the mobile robot 600 sensed by the sensor 503 and processed and computed by the processor 502 in step 103. A plurality of black points are the plurality of neighboring key frames described in step 301. The plurality of neighboring key frames may be a plurality of closest key frames, for example, the key frame i to the key frame m, retrieved by the processor 502 from the key frame list KFL based on the current pose of the mobile robot 600 and according to distances from the key frames to the current pose. It may be understood that when the mobile robot 600 is just started up, the plurality of neighboring key frames are closest key frames corresponding to the initial position L0. In other words, after the mobile robot 600 starts to move, the plurality of neighboring key frames are simultaneously changed in real time.

A plurality of diagonal points are key frames that are the most distant from the current pose in the plurality of neighboring key frames. The plurality of diagonal points constitute a convex hull of a current frame in step 302, and a polygon constituted by connections of the plurality of diagonal points constitutes the local map PM. Thus, the processor 502 may determine whether the key frame i to the key frame m corresponding to the local map PM are changed by determining whether the plurality of diagonal points are changed in step 303. It may be understood that, after the mobile robot 600 starts to move, positions of the plurality of diagonal points are different, and polygons constituted by the connections of the plurality of diagonal points are also different. Thus, the key frame i to the key frame m corresponding to the local map PM are different.

Figure 6:
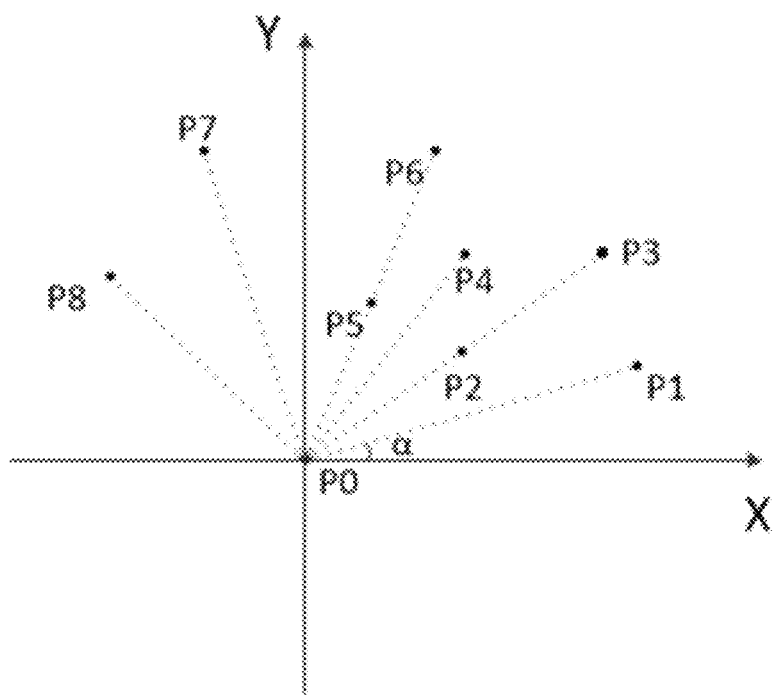
FIG. 6 shows a schematic computation diagram of a convex hull according to an embodiment of the disclosure.

Refer to FIG. 6 for a computation method for the plurality of diagonal points (that is, convex hulls). For example, the processor 502 places all points in FIG. 5 in an identical two-dimensional coordinate system. A point having the smallest ordinate is a point (P0 as shown in the figure) in the convex hull, and the point P0 is used as an origin of the coordinate system. A polar angle $\alpha$ of another point relative to P0 is computed. If polar angles of two points are identical, the points are sorted according to distances from the points to P0. Finally, a plurality of points are sorted sequentially as P1 to P8 as shown in FIG. 5. Then, an empty stack is established, and P0, P1 and P2 are pushed into the stack. Then, starting from a point P3, operations are conducted on each to-be-determined point $P_{i=3, 4, 5, 6, 7, 8}$ as follows: Whether a current to-be-determined point is located at a left side of a line connecting two points on a current stack top is checked. The determination method may conduct determination through a vector cross product method, that is, if $(P_{i-2}, P_{i-1}) \times (P_{i-1}, P_i) > 0$, it is determined that the current to-be-determined point is located at the left side of the line connecting the two points on the current stack top. If the current to-be-determined point is located at the left side, determination is continued. Otherwise, a last point is popped up from the stack. Then, the current to-be-determined point is pushed into the stack, and each to-be-determined point is sequentially processed. Finally, points left in the stack are a plurality of diagonal points on a convex hull.

Further, with reference to FIG. 2, the localization method 10 for a mobile robot further includes the following steps:

Step 105: the processor 502 outputs the current position of the mobile robot 600 in response to the key frame corresponding to the local map PM being unchanged. In some embodiments, the processor 502 may display the current position of the mobile robot 600 on a display apparatus of the mobile robot 600, such that the operator knows the current position of the mobile robot 600 in real time. Then, the localization method 10 for a mobile robot continues to return to step 101, and the processor 502 determines whether the localization method currently operates in the mode 101a or the mode 101b.

In the localization method 10 for a mobile robot provided by the disclosure, in response to determining that the mobile robot 600 operates in the mode 101a (that is, the localization mode), information of the local map PM may be loaded according to the current position of the mobile robot 600. Loading point clouds of all the key frames of the global map AM at a time is avoided, such that memory space and computation capability consumption can be effectively reduced, the processor 502 computes the current pose in a multi-thread manner, and operation efficiency is improved accordingly.

Then, refer to FIG. 7. FIG. 7 is a flowchart following the method in FIG. 2. In some embodiments, the localization method 10 for a mobile robot further includes the following step:

Step 401: the processor 502 conducts pose matching and outputs the current pose of the mobile robot 600.

Regarding step 401 in which the current pose is output, in some embodiments, the processor 502 may divide point cloud distribution computation of the current position into a plurality of subtasks, and the plurality of subtasks may conduct multi-thread computation through a plurality of processing units in the processor 502, such that operation efficiency is improved. In some embodiments, point cloud distribution computation of the current position may include the following step: the processor 502 conducts NDT matching. However, the disclosure is not limited to computing a point cloud distribution of the current position through a NDT matching technology. In other embodiments, the method may be implemented through an ICP algorithm or a GICP technology.

In some embodiments, the localization method 10 for a mobile robot further includes the following step:

Step 402: the processor 502 determines, according to the current pose of the mobile robot 600, whether the current frame is the key frame, if yes, step 403 is entered, and otherwise, step 404 is entered. In some embodiments, regarding step 402 in which whether the current frame is the key frame is determined, the processor 502 may determine whether the current frame is the key frame according to factors such as a time interval, a movement distance, or an offset angle between a previous frame and the current frame.

In some embodiments, the localization method 10 for a mobile robot further includes the following step:

Step 403: the processor 502 adds the current frame to the key frame list KFL.

Step 404: the processor 502 determines, according to the current pose of the mobile robot 600, whether the key frame corresponding to the local map PM is changed, if yes, step 401 is returned to, and computation of the current pose is continued, and otherwise, step 101 is returned to, and the processor 502 determines whether the mobile robot currently operates in the mode 101a or the mode 101b. In some embodiments, reference may be made to the embodiment of step 104 for description of step 404, and specific details are omitted herein for brevity.

As used herein, the terms "approximately", "substantially", "basically", and "roughly" are used to describe and consider small variations. When used in combination with an event or situation, the terms may indicate an example in which the event or situation precisely occurs and an example in which the event or situation approximately occurs. As used herein, with respect to a specified value or range, the term "roughly" generally means within ±10%, ±5%, ±1%, or ±0.5% of the specified value or range. The range may be expressed as a range from one end point to another end point, or between two end points herein. All ranges disclosed herein include end points unless otherwise specified. The term "substantially coplanar" may describe two surfaces that are located along an identical plane and are within a few micrometers (μm), and for example, located along an identical plane and within 10 μm, 5 μm, 1 μm, or 0.5 μm. With reference to "substantially" identical values or features, the term may refer to a value that is within ±10%, ±5%, ±1%, or ±0.5% of a mean value of the values.

As used herein, the terms "approximately", "substantially", "basically", and "roughly" are used to describe and explain small variations. When used in combination with an event or situation, the terms may indicate an example in which the event or situation precisely occurs and an example in which the event or situation approximately occurs. For example, when used in combination with a value, the terms may indicate a variation range less than or equal to ±10% of the value, and for example, less than or equal to ±5%, less than or equal to ±4%, less than or equal to ±3%, less than or equal to ±2%, less than or equal to #1%, less than or equal to ±0.5%, less than or equal to ±0.1%, or less than or equal to ±0.05%. For example, if a difference between two values is less than or equal to ±10% of a mean value of the values (for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%), the two values may be considered to be "substantially" or "roughly" identical. For example, "substantially" parallel may refer to an angle variation range less than or equal to ±10° with respect to 0°, and for example, less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°. For example, "substantially" perpendicular may refer to an angle variation range less than or equal to ±10° with respect to 90°, and for example, less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

For example, if a displacement amount between two surfaces is equal to or less than 5 μm, equal to or less than 2 μm, equal to or less than 1 μm, or equal to or less than 0.5 μm, the two surfaces may be considered to be coplanar or substantially coplanar. If a displacement amount between any two points on a surface relative to a plane is equal to or less than 5 μm, equal to or less than 2 μm, equal to or less than 1 μm, or equal to or less than 0.5 μm, the surface may be considered to be planar or substantially planar.

As used herein, singular terms "a", "an" and "the" may include plural indication objects, unless otherwise explicitly indicted in the context. In the description of some embodiments, a component provided "on" or "at an upper portion of" another component may cover a case where the former component is directly on the latter component (for example, in physical contact with the latter component), and a case where one or more intermediate components are located between the former component and the latter component.

As used herein, for ease of description, relative spatial terms such as "under", "lower portion", "lower part", "upper portion", "upper part", "lower part", "left side", and "right side" may be used herein to describe a relation between one component or feature and another component or feature as illustrated in the accompanying drawings. In addition to the orientation depicted in the figure, the spatial relative terms are intended to cover different orientations of an apparatus during use or operation. The device may be oriented in another manner (rotated by 90 degrees or at another orientation), and the relative spatial descriptors used herein may be correspondingly explained. It should be understood that when a component is referred to as being "connected to" or "coupled to" another component, the component may be directly connected to or coupled to the another component, or an intermediate component may exist.

What are described above summarize features of several embodiments and detailed aspects of the disclosure. The embodiments described in the disclosure can be easily used as a basis for designing or modifying other processes and a structure for executing identical or similar objectives and/or obtaining identical or similar advantages of the embodiments introduced in the disclosure. The equivalent structures do not depart from the spirit and scope of the disclosure, and different variations, replacements, and changes may be made without departing from the spirit and scope of the disclosure.

We claim:

1. A mobile robot, comprising a processor, the processor being configured to execute a program instruction so as to implement the following steps:
    determining, each time the mobile robot is started up, whether the mobile robot operates in a first mode;
    loading a local map from a memory according to an initial position of the mobile robot in response to the mobile robot operating the first mode;
    conducting pose matching according to a current position point cloud based on the local map, and outputting a current pose;
    determining, according to the current pose, whether a key frame corresponding to the local map is changed; and
    outputting a current position of the mobile robot in response to the key frame corresponding to the local map being unchanged;
    wherein determining, according to the current pose, whether a key frame corresponding to the local map being changed comprises:
        loading a plurality of neighboring key frames according to the current pose;
        computing concave and convex hulls of the current pose according to the plurality of neighboring key frames; and
        determining, according to the concave and convex hulls of the current pose, whether the key frame corresponding to the local map is changed.

2. The mobile robot according to claim 1, wherein loading the local map from the memory according to the initial position of the mobile robot in response to the mobile robot operating in the first mode comprises:
    setting the initial position of the mobile robot; and
    loading a local map key frame pose covering the initial position and a local map key frame point cloud path from the memory according to the initial position.

3. The mobile robot according to claim 2, wherein setting the initial position of the mobile robot comprises:
    loading a pose, stored in the memory, of the mobile robot when the mobile robot is shut down previously from the memory as the initial position.

4. The mobile robot according to claim 2, wherein setting the initial position of the mobile robot comprises:
    inputting the initial position of the mobile robot through an input interface.

5. The mobile robot according to claim 1, wherein computing concave and convex hulls of the current pose according to the plurality of neighboring key frames comprises:
    looking up a plurality of convex hull points from the plurality of neighboring key frames, a polygon defined by the plurality of convex hull points surrounding other neighboring key frames except the plurality of convex hull points in the plurality of neighboring key frames, and the polygon forming the concave and convex hulls of the current pose.

6. The mobile robot according to claim 1, wherein determining, according to the concave and convex hulls of the current pose, whether the key frame corresponding to the local map being changed comprises:
    determining, based on whether the plurality of convex hull points of the polygon being changed, whether the key frame corresponding to the local map is changed.

7. The mobile robot according to claim 1, wherein conducting pose matching according to the current position point cloud based on the local map, and outputting the current pose comprise:
    driving a sensor to sense point cloud data of the current position; and
    computing a point cloud distribution of the current position in a multi-thread manner.

8. The mobile robot according to claim 7, wherein computing the point cloud distribution of the current position in the multi-thread manner comprises:
    conducting normal distributions transform (NDT) matching.

9. The mobile robot according to claim 1, wherein the processor is further configured to execute the program instruction so as to implement the following steps:
    re-conducting pose matching according to the current pose in response to the key frame corresponding to the local map being changed.

10. The mobile robot according to claim 9, wherein re-conducting pose matching according to the current pose in response to the key frame corresponding to the local map being changed comprises:
    computing a point cloud distribution of the current position in a multi-thread manner.

11. The mobile robot according to claim 10, wherein computing the point cloud distribution of the current position in the multi-thread manner comprises:
   conducting normal distributions transform (NDT) matching.

12. The mobile robot according to claim 1, wherein the processor is further configured to execute the program instruction so as to implement the following steps:
   conducting pose matching in response to the mobile robot operating in a second mode different from the first mode each time the mobile robot is started up, and outputting the current pose.

13. The mobile robot according to claim 12, wherein the processor is further configured to execute the program instruction so as to implement the following step:
   determining whether a current frame is the key frame according to the current pose.

14. The mobile robot according to claim 13, wherein the processor is further configured to execute the program instruction so as to implement the following step:
   adding the current frame to a key frame list in response to the current frame being the key frame.

15. The mobile robot according to claim 12, wherein the processor is further configured to execute the program instruction so as to implement the following step:
   determining, according to the current pose, whether the key frame corresponding to the local map is changed in response to the current frame being added to the key frame list.

16. The mobile robot according to claim 15, wherein the processor is further configured to execute the program instruction so as to implement the following step:
   re-conducting pose matching according to the current pose in response to the key frame corresponding to the local map being changed.

17. The mobile robot according to claim 12, wherein the first mode is a localization mode, and the second mode is a mapping mode.

18. A controller, comprising a processor, the processor being configured to execute a program instruction so as to implement the following steps:
   determining, each time a mobile robot is started up, whether the mobile robot operates in a first mode;
   loading a local map from a memory according to an initial position of the mobile robot in response to the mobile robot operating in the first mode;
   conducting pose matching according to a current position point cloud based on the local map, and outputting a current pose;
   determining, according to the current pose, whether a key frame corresponding to the local map is changed; and
   outputting a current position of the mobile robot in response to the key frame corresponding to the local map being unchanged;
   wherein determining, according to the current pose, whether a key frame corresponding to the local map being changed comprises:
   loading a plurality of neighboring key frames according to the current pose;
   computing concave and convex hulls of the current pose according to the plurality of neighboring key frames; and
   determining, according to the concave and convex hulls of the current pose, whether the key frame corresponding to the local map is changed.

19. A localization method for a mobile robot, comprising:
   determining, each time the mobile robot is started up, whether the mobile robot operates in a first mode;
   loading a local map from a memory according to an initial position of the mobile robot in response to the mobile robot operating in the first mode;
   conducting pose matching according to a current position point cloud based on the local map, and outputting a current pose; determining, according to the current pose, whether a key frame corresponding to the local map is changed; and
   outputting a current position of the mobile robot in response to the key frame corresponding to the local map being unchanged;
   wherein determining, according to the current pose, whether a key frame corresponding to the local map being changed comprises:
   loading a plurality of neighboring key frames according to the current pose;
   computing concave and convex hulls of the current pose according to the plurality of neighboring key frames; and
   determining, according to the concave and convex hulls of the current pose, whether the key frame corresponding to the local map is changed.

* * * * *